(12) United States Patent
Kano et al.

(10) Patent No.: US 7,107,846 B2
(45) Date of Patent: Sep. 19, 2006

(54) CAPACITANCE TYPE ACCELERATION SENSOR

(75) Inventors: Kazuhiko Kano, Toyoake (JP); Tetsuo Yoshioka, Okazaki (JP); Takao Iwaki, Obu (JP); Yukihiro Takeuchi, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/265,281

(22) Filed: Nov. 3, 2005

(65) Prior Publication Data

US 2006/0053890 A1    Mar. 16, 2006

Related U.S. Application Data

(62) Division of application No. 10/703,461, filed on Nov. 10, 2003, now Pat. No. 7,004,026.

(30) Foreign Application Priority Data

Nov. 20, 2002    (JP) .............................. 2002-336802

(51) Int. Cl.
    *G01P 15/125* (2006.01)
(52) U.S. Cl. .................................. 73/514.32
(58) Field of Classification Search ............. 73/514.32, 73/504.04
    See application file for complete search history.

(56) References Cited

U.S. PATENT DOCUMENTS

| | | | |
|---|---|---|---|
| 5,447,068 A * | 9/1995 | Tang ........................ | 73/514.32 |
| 6,151,966 A | 11/2000 | Sakai et al. | |
| 6,591,678 B1 * | 7/2003 | Sakai ....................... | 73/514.32 |
| 6,644,117 B1 | 11/2003 | Kueck et al. | |
| 6,744,173 B1 | 6/2004 | Behin et al. | |

* cited by examiner

*Primary Examiner*—John E. Chapman
(74) *Attorney, Agent, or Firm*—Posz Law Group, PLC

(57) ABSTRACT

A capacitance type acceleration sensor includes a semiconductor substrate, a weight portion supported with the substrate through a spring portion, a movable electrode integrated with the weight portion, and a fixed electrode cantilevered with the substrate. The movable electrode is displaced along with a facing surface of the movable electrode in accordance with acceleration. The facing surface of the movable electrode faces a facing surface of the fixed electrode so as to provide a capacitor. The capacitance of the capacitor changes in accordance with a displacement of the movable electrode so that an outer circuit detects the acceleration as a capacitance change. Each facing surface of the movable and fixed electrodes has a concavity and convexity portion for increasing the capacitance change.

6 Claims, 8 Drawing Sheets

1a, 1b
2a, 2b

CAPACITANCE TYPE ACCELERATION SENSOR

CROSS REFERENCE TO RELATED APPLICATION

This application is a divisional application of U.S. patent application Ser. No. 10/703,461, now U.S. Pat. No. 7,004,026, which was filed on 10 Nov. 2003, and is based on Japanese Patent Application No. 2002-336802 filed on Nov. 20, 2002, the disclosure of which is incorporated herein by reference.

FIELD OF THE INVENTION

The present invention relates to a capacitance type acceleration sensor having high sensitivity.

BACKGROUND OF THE INVENTION

A capacitance type acceleration sensor according to a prior art is disclosed in U.S. Pat. No. 6,151,966. The sensor includes a movable electrode and a fixed electrode, each of which has a plurality of teeth. The movable electrode faces the fixed electrode so that they form a capacitor. When acceleration is applied to the sensor, a movable portion having a weight portion and the movable electrode in the sensor is displaced. Then, the capacitance of the capacitor changes in accordance with the displacement of the movable electrode. This capacitance change is measured so that the acceleration is detected. Here, the movable electrode is integrated with the weight portion, and the displacement direction of the movable electrode is perpendicular to a facing surface of the movable electrode. The facing surface of the movable electrode faces the fixed electrode. When the movable electrode moves toward the fixed electrode and the distance between the movable and fixed electrodes becomes small, the capacitance becomes larger. When the distance between the movable and fixed electrodes becomes large, the capacitance becomes smaller.

When the movable electrode is displaced, a squeeze damping effect is generated by viscosity of air disposed between the movable electrode and the fixed electrode. Particularly, the squeeze damping works between the facing surfaces of the movable and fixed electrodes. Therefore, when the sensor detects the acceleration near a resonant frequency of the movable portion, the displacement of the movable electrode and the capacitance change in accordance with the displacement become small, so that fine acceleration may not be detected. Namely, the sensor sensitivity is decreased.

SUMMARY OF THE INVENTION

In view of the above problem, it is an object of the present invention to provide a capacitance type acceleration sensor having high sensitivity.

A capacitance type acceleration sensor includes a semiconductor substrate, a weight portion supported with the substrate through a spring portion, a movable electrode integrated with the weight portion, and a fixed electrode cantilevered with the substrate. The movable electrode together with the weight portion is displaced along with a facing surface of the movable electrode in accordance with acceleration applied to the weight portion. The facing surface of the movable electrode faces a facing surface of the fixed electrode so as to provide a capacitor having a capacitance. The capacitance of the capacitor changes in accordance with a displacement of the movable electrode so that an outer circuit detects the acceleration as a capacitance change. Each facing surface of the movable and fixed electrodes has a concavity and convexity portion for increasing the capacitance change.

In the above sensor, the capacitance change becomes larger because of the concavity and convexity portion. Therefore, the sensor sensitivity is improved so that the sensor has high sensitivity.

Preferably, each of the movable and fixed electrodes has a plurality of teeth, and the teeth of the movable and fixed electrodes are disposed alternately so that sidewalls of the teeth provide the facing surfaces. Further, the movable electrode has a predetermined shape in such a manner that the movable portion resonates at a vibration frequency of the acceleration for increasing the capacitance change. In this sensor, the movable portion is formed to resonate at the acceleration vibration frequency, and the movable portion is displaced along with the facing surface, in which the movable portion is affected with the slide damping effect. Accordingly, the magnification of resonance becomes larger, so that the displacement of the movable portion becomes large. Thus, the capacitance change is also increased, so that the sensor sensitivity is improved.

Preferably, each concavity and convexity portion of the movable and fixed electrodes has a plurality of convexities and concavities, and each convexity of the movable electrode faces the convexity of the fixed electrode, respectively, when no acceleration is applied. More preferably, each of the convexities and the concavities has a length in a displacement direction of the movable electrode, and the length of the convexity is equal to or longer than that of the concavity. More preferably, the length of the concavity is equal to or larger than twice of a maximum displacement of the movable portion. In this case, the relationship between the capacitance change and the displacement of the movable portion monotonically increases or decreases, so that the sensor can detect the acceleration easily.

Preferably, part of the convexity of the movable electrode faces the convexity of the fixed electrode when no acceleration is applied. In this case, the sensor can detect the direction of the acceleration by detecting the increase and decrease from the initial capacitance.

Further, a capacitance type acceleration sensor includes a semiconductor substrate, a weight portion supported with the substrate through a spring portion, a movable electrode integrated with the weight portion, and a fixed electrode cantilevered with the substrate. The movable electrode together with the weight portion is displaced perpendicularly to a facing surface of the movable electrode in accordance with acceleration applied to the weight portion. The facing surface of the movable electrode faces a facing surface of the fixed electrode so as to provide a capacitor having a capacitance. The capacitance of the capacitor changes in accordance with a displacement of the movable electrode so that an outer circuit detects the acceleration as a capacitance change. The movable electrode protrudes from both sidewalls of the weight portion, the sidewall being perpendicular to the substrate. Each of the movable electrode and the weight portion has a height in a perpendicular direction perpendicular to the substrate. The height of the movable electrode is substantially equal to that of the weight portion. Each facing surface of the movable and fixed electrodes has a length in a protrusion direction of the movable electrode and a height in the perpendicular direction of the substrate.

The length of the facing surface is equal to or smaller than the height of the facing surface.

In the above sensor, the capacitance change becomes larger so that the sensor sensitivity is improved and the sensor has high sensitivity.

Preferably, each of the movable and fixed electrodes has a plurality of teeth, and the teeth of the movable and fixed electrodes are disposed alternately so that sidewalls of the teeth provide the facing surfaces. Further, the movable electrode has a predetermined shape in such a manner that the movable portion resonates at a vibration frequency of the acceleration for increasing the capacitance change. In this case, the magnification of resonance is increased, and the displacement of the movable portion at the resonance point is also enhanced, so that the capacitance change becomes large. Thus, the sensor sensitivity is improved so that the sensor can detect a fine acceleration.

Furthermore, a capacitance type acceleration sensor includes a semiconductor substrate, a weight portion supported with the substrate through a spring portion, a movable electrode integrated with the weight portion, and a fixed electrode cantilevered with the substrate. The movable electrode together with the weight portion is displaced toward the fixed electrode in accordance with acceleration applied to the weight portion. The movable electrode includes a facing surface facing a facing surface of the fixed electrode so as to provide a capacitor having a capacitance. The capacitance of the capacitor changes in accordance with a displacement of the movable electrode so that an outer circuit detects the acceleration as a capacitance change. Each facing surface of the movable and fixed electrodes inclines at a predetermined angle with respect to a displacement direction. The predetermined angle is in a range between 0° and 90°.

In the above sensor, the capacitance change becomes larger so that the sensor sensitivity is improved and the sensor has high sensitivity.

Preferably, each of the movable and fixed electrodes has a plurality of teeth, and the teeth of the movable and fixed electrodes are disposed alternately so that sidewalls of the teeth provide the facing surfaces. Further, the movable electrode has a predetermined shape in such a manner that the movable portion resonates at a vibration frequency of the acceleration for increasing the capacitance change. In this case, the capacitance change becomes much larger, so that the sensor can detect a fine acceleration.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

FIRST EMBODIMENT

With using resonant effect, a capacitance type acceleration sensor according to a first embodiment of the present invention detects fine acceleration, for example, under 1G (i.e., under the gravitational constant). The sensor is suitably used for a vibration sensor or a gyroscope. The vibration sensor detects a bone conduction sound conducting through a bone.

Figure 1:
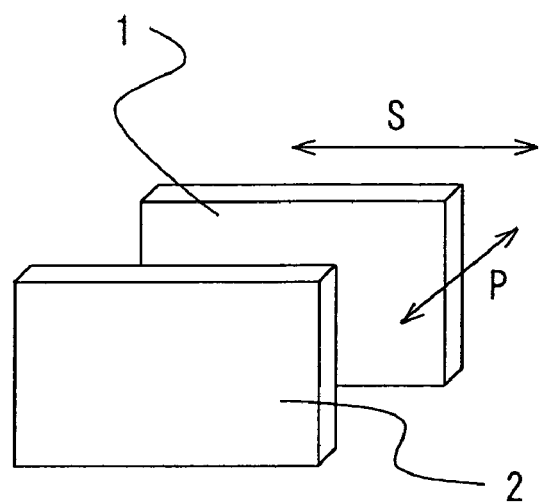
FIG. 1 is a schematic perspective view showing a pair of facing surfaces of fixed and movable electrodes in a capacitance type acceleration sensor according to a first embodiment of the present invention.
Figure 2:
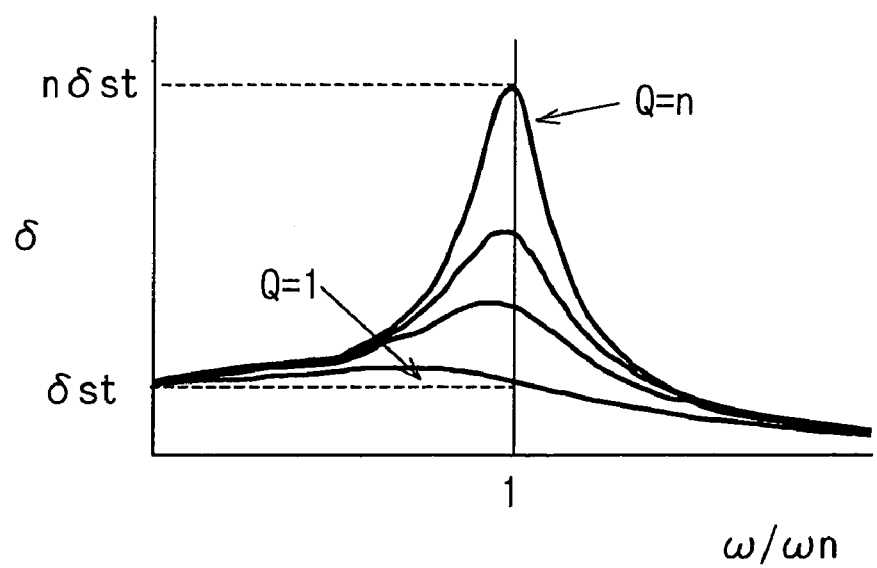
FIG. 2 is a graph showing a relationship between amplitude δ and frequency ratio ω/ωn in the sensor according to the first embodiment.

Referring to FIGS. 1 and 2, function and operation of the sensor with using the resonant effect will be explained as follows. The resonant frequency of the sensor is set in a measurement frequency range so that a displacement of a movable portion in the sensor is amplified because of the resonant effect. In this case, damping effect of the movable portion relates to the amplification of the displacement.

As shown in FIG. 1, a movable electrode 1 and a fixed electrode 2 in the sensor have facing surfaces, respectively. Each facing surface of the movable and fixed electrodes 1, 2 faces each other. Damping effect works between the facing surfaces of the movable and fixed electrodes 1, 2 because of viscosity of air disposed between the facing surfaces. When the movable electrode 1 is displaced in a perpendicular direction P perpendicular to the facing surface, the squeeze damping effect is appeared. When the movable electrode is displaced along with the facing surface, i.e., in a sliding direction S, a slide damping effect is appeared.

In a conventional capacitance type acceleration sensor, since the distance between the movable and fixed electrodes is shorter than the length of the facing surface, the movable electrode is movable in the perpendicular direction perpendicular to the facing surface so that a predetermined displacement makes much more capacitance change. However, in the conventional sensor, as the distance between the movable and fixed electrodes becomes shorter, it is difficult to detect fine acceleration because the squeeze damping effect appeared between the electrodes becomes larger in accordance with the displacement of the movable electrode.

Consequently, in the sensor according to the first embodiment, the movable portion 1 is set to move in a sliding direction S (i.e., the direction along with the facing surface), in which the damping effect becomes small. Simultaneously, the displacement of the movable portion 1 is amplified by the resonant effect. In this case, even when fine acceleration is applied to the sensor, the capacitance change becomes large so that the sensor can detect the fine acceleration.

The above method is explained with using numerical formulas.

$$\Delta Co = \frac{\varepsilon H X}{D} \quad \text{(F1)}$$

$$M\ddot{X} + E\dot{X} + KX = F\cos(\omega T) \quad \text{(F2)}$$

$$X = \frac{\delta st}{\sqrt{\left(1-\left(\frac{\omega}{\omega n}\right)^2\right)^2 + \left(\frac{1}{Q}\frac{\omega}{\omega n}\right)^2}}\cos(\omega T - \beta) \quad \text{(F3)}$$

$$Q = \frac{\sqrt{MK}}{E} = \frac{M}{E}\omega n \quad \text{(F4)}$$

$$\delta st = \frac{M}{K}\alpha \quad \text{(F5)}$$

Here, $\Delta Co$ represents capacitance change, $\varepsilon$ a dielectric constant, H a height of the facing surface of a pair of the movable electrode and the fixed electrode, D a distance between the movable electrode and the fixed electrode, X a displacement of the movable electrode, M a mass of a movable portion, E a damping coefficient of the movable portion, K a spring constant, F vibration force of amplitude, $\omega$ a frequency of vibration, $\beta$ a delay angle, $\omega n$ a resonant frequency of vibration, Q a magnification of resonance (i.e., a Q-value), $\delta st$ a static amplitude, and $\alpha$ acceleration.

Formula F1 shows a relationship between the capacitance change $\Delta Co$ corresponding to the sensor sensitivity of the sensor and the displacement X of the movable electrode 1. The displacement X shows a displacement in the sliding direction S along with the facing surface. Formula F2 shows a dynamic equation of the movable portion 1. The solution of the dynamic equation F2 is shown as Formula F3. Formula F4 defines the magnification of resonance Q. Formula F5 shows a relationship between the acceleration $\alpha$ and the static amplitude $\delta st$.

Here, the maximum amplitude $\delta$ of the movable portion is obtained by Formula F6.

$$\delta = \frac{\delta st}{\sqrt{\left(1-\left(\frac{\omega}{\omega n}\right)^2\right)^2 + \left(\frac{1}{Q}\frac{\omega}{\omega n}\right)^2}} \quad \text{(F6)}$$

FIG. 2 also shows the relationship between the maximum amplitude $\delta$ and the frequency ratio $\omega/\omega n$ in case of various magnifications of resonance Q at the resonant frequency $\omega n$ obtained by Formula F4. In a case where the frequency of vibration $\omega$ coincides with the resonant frequency of vibration $\omega n$, i.e., in case of resonance point ($\omega=\omega n$), Formula F6 is displaced as Formula F7.

$$\delta = Q\delta st \quad \text{(F7)}$$

Accordingly, at the resonance point, the amplitude $\delta$, i.e., the displacement X shows Q-fold of the static amplitude $\delta st$. Here, the magnification of resonance Q and the damping coefficient E have the relationship of Formula F4. When the movable electrode 1 is displaced in the sliding direction S along with the facing surface of the movable electrode 1, the slide damping effect is appeared between the electrodes 1, 2, so that the damping coefficient E becomes small. That is because the magnitude of the slide damping effect is smaller than that of the squeeze damping effect. Therefore, the slide damping effect does not much affect the sensor 100, so that the magnification of resonance Q becomes larger. Then, the displacement X shown in Formula F3 is increased, and the capacitance change $\Delta Co$ becomes larger. Thus, the sensor sensitivity is improved.

Figure 3A:
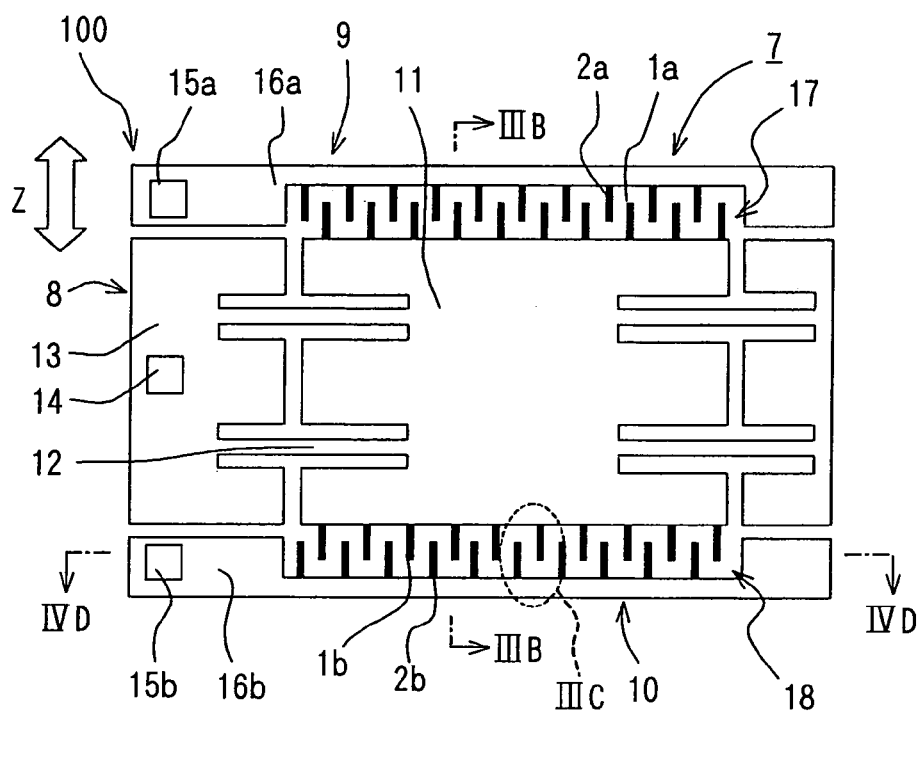
FIG. 3A is a schematic plan view showing a sensing portion of the sensor.
Figure 3B:
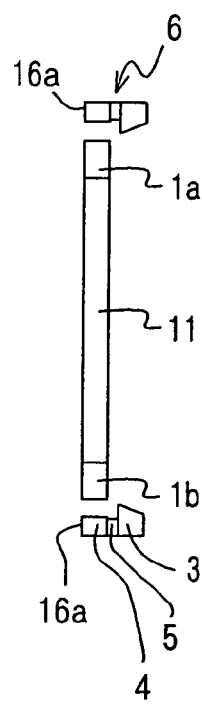
FIG. 3B is a cross-sectional view showing the sensing portion taken along line IIIB—IIIB in FIG. 3A.
Figure 3C:
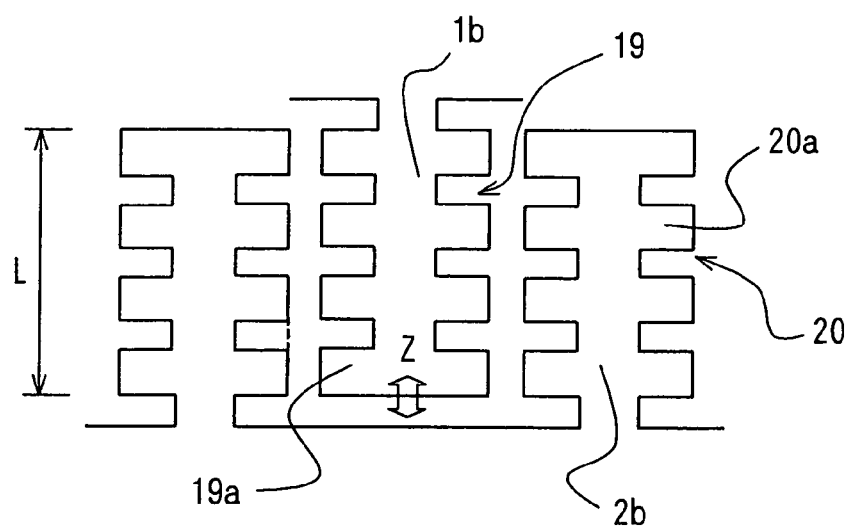
FIG. 3C is an enlarged plan view showing part of the sensing portion of IIIC in FIG. 3A, according to the first embodiment.

The sensor 100 according to the first embodiment is shown in FIGS. 3A to 3C. A sensing portion 7 of the sensor 100 is formed on a silicon on insulator substrate (i.e., SOI substrate) 6 with using semiconductor processing techniques such as a micro-machining method. The SOI substrate 6 includes the first semiconductor layer 3, the second semiconductor layer 4, and an insulation layer 5. The first and second semiconductor layers 3, 4 are made of single crystal silicon. The insulation layer 5 as a sacrifice layer is made of, for example, oxide silicon.

The sensing portion 7 includes a movable portion 8 and a pair of fixed portions 9, 10. Between the movable portion 8 and the fixed portion 9, 10, a predetermined distance is set, so that they are insulated each other. The movable portion 8 includes a pair of movable electrodes 1a, 1b, a weight portion 11, a spring portion 12, an anchor 13, and an electrode pad 14. The movable electrodes 1a, 1b are protruded from both sides of the weight portion 11 so as to be along with an acceleration direction Z shown in FIG. 3A. The movable electrodes 1a, 1b are integrally formed with the weight portion 11. Each movable electrode 1a, 1b has, for example, ten teeth disposed on each side of the weight portion 11. The weight portion 11 as a mass is applied with the acceleration. The anchor 13 connects to the first semiconductor layer 3 through the insulation layer 5. The spring portion 12 has a beam, both ends of which are fixed, so that the spring portion 12 connects the weight portion 11 and the anchor 13. The spring portion 12 is disposed perpendicularly to the acceleration direction Z. The spring portion 12 has, for example, four beams.

In a region where the movable electrodes 1a, 1b, the weight portion 11, and the spring portion 12 are formed, the first semiconductor layer 3 and the insulation layer 5 are selectively etched and eliminated so that the bottom of the second semiconductor layer 4 is exposed. The spring portion 12 connecting to the weight portion 11 has a spring function for moving along with the acceleration direction Z. Therefore, when the sensor 100 is applied with the acceleration including a component of the acceleration direction Z, the weight portion 11 and the movable electrodes 1a, 1b are displaced in the acceleration direction Z. After the acceleration disappears and no acceleration applies to the sensor, the spring portion 12 returns to a neutral position. Therefore, the weight portion 11 and the movable electrodes 1a, 1b also return to the neutral position, respectively.

The movable portion 8 vibrates sympathetically, i.e., resonates according to the vibration frequency of the acceleration. A resonant frequency $\omega n$ of the movable portion 8, which is parallel to the substrate 6, is described as Formula F8.

$$\omega n = \frac{1}{2\pi}\sqrt{\frac{16YM^3}{S\rho N^3}} \qquad (F8)$$

Here, Y represents the Young's modulus (i.e., Y is 170 GPa), M a width of the spring portion 12, S an area of the weight portion 11, the area is parallel to the substrate 6, i.e., the area of the upper surface of the weight portion 11, ρ a mass density (i.e., ρ is 2330 kg/m³), and N a length of the spring portion 12. Accordingly, the movable portion 8 is formed so as to be satisfied with Formula F8 so that the resonant frequency ωn of the movable portion 8 coincides with the vibration frequency of the acceleration. Thus, the displacement of the movable portion 8 can be amplified with using the resonant effect.

The electrode pad 14 is formed on the anchor 13, and connects to an outer electrical circuit such as capacitance-voltage (i.e., C-V) convert circuit.

Each fixed portion 9, 10 includes a fixed electrode 2a, 2b, an electrode pad 15a, 15b, and an anchor 16a, 16b, respectively. The electrode pad 15a, 15b is formed on the anchor 16a, 16b. The anchor 16a, 16b is parallel to the weight portion 11. The fixed electrode 2a, 2b is protruded from the anchor 16a, 16b, and faces the movable electrode 1a, 1b protruded from the side of the weight portion 11. The fixed electrode 16a, 16b is parallel to the movable electrode 1a, 1b, so that a predetermined distance between the fixed electrode 2a, 2b and the movable electrode 1a, 1b is provided. The anchor 16a, 16b is fixed on the first semiconductor layer 3 through the insulation layer 5. The bottom of the second semiconductor layer 4 composing the fixed electrode 2a, 2b is exposed so that the fixed electrode 2a, 2b is cantilevered with the anchor 16a, 16b. In the first embodiment, each fixed electrode 2a, 2b has ten teeth, which is the same number as the teeth of the movable electrode 1a, 1b. The movable electrode 1a and the fixed electrode 2a provide the first detection portion 17, and the movable electrode 1b and the fixed electrode 2b provide the second detection portion 18.

The electrode pads 15a, 15b are formed on the anchors 16a, 16b, respectively. The pads 15a, 15b are connected to the C-V convert circuit. Although each of the movable electrodes 1a, 1b and the fixed electrodes 2a, 2b has ten teeth, each of them can have other number of teeth such as five or fifteen teeth.

In the sensor 100, the first detection portion 17 provided by the movable electrode 1a and the fixed electrode 2a has a total capacitance of CS1. The second detection portion 18 provided by the movable electrode 1b and the fixed electrode 2b has a total capacitance of CS2. In a case where no acceleration is applied to the sensor 100, the movable and fixed electrodes 1a, 1b, 2a, 2b are arranged in a predetermined position so that the difference δC between the total capacitances CS1 and CS2 (i.e., δC=CS1−CS2) becomes almost zero.

When the movable portion 8 is applied with the acceleration in the acceleration direction Z, the weight portion 11 moves in the acceleration direction Z. Together with the weight portion 11, the movable electrodes 1a, 1b are displaced. Here, each facing surface of the movable and fixed electrodes 1a, 1b, 2a, 2b has a concavity and convexity portion 19, 20, respectively, as shown ion FIG. 3C. Each concavity and convexity portion 19, 20 is disposed perpendicularly to the facing surface. A convexity 19a disposed on the movable electrode 1a, 1b faces a convexity 20a disposed on the fixed electrode 2a, 2b. Accordingly, when the movable electrode 1a, 1b is displaced, the capacitance between the convexities 19a, 20a of the movable and fixed electrodes 1a, 1b, 2a, 2b changes. Therefore, the capacitance of the first detection portion 17 changes with the variation of ΔCS1, and the capacitance of the second detection portion 18 changes with the variation of ΔCS2. The sum of the absolute value of the variations |ΔCS1|+|ΔCS2| is measured as a voltage change by the C-V convert circuit, so that the acceleration is detected.

Figure 4A:
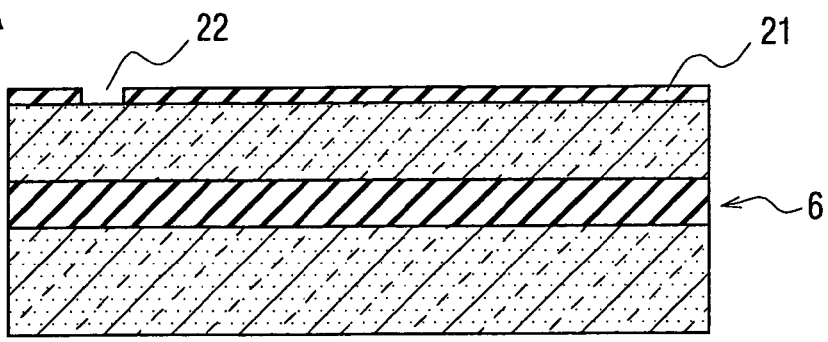
FIGS. 4A to 4D are cross-sectional views of the sensor explaining a manufacturing method of the sensor according to the first embodiment.
Figure 4B:
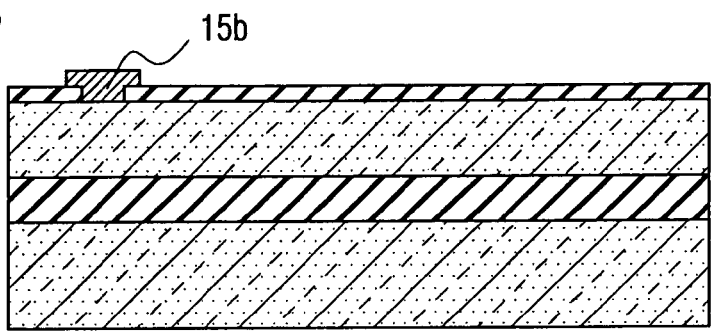

The sensor 100 according to the first embodiment is formed as follows. FIGS. 4A to 4D explain a manufacturing process for forming the sensor 100. Here, FIGS. 4D is a cross-sectional view showing the sensor 100 taken along line IVD—IVD in FIG. 3A. As shown in FIG. 4A, the SOI substrate 6 includes the first semiconductor layer 3, the insulation layer 5 made of oxide film, and the second semiconductor layer 4. The first and second semiconductor layers 3, 4 are made of silicon. At first, the first silicon oxide film 21 is formed on the SOI substrate 6. Then, a contact hole 22 is formed in the first silicon oxide film 21. The contact hole 22 is used for the electrode pad 15b on the fixed portion 10. In the contact hole 22, an aluminum film is formed so as to form the electrode pad 15b.

Figure 4C:
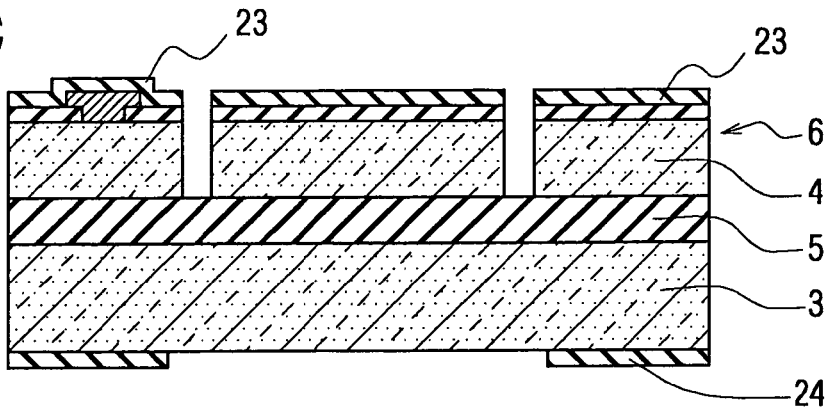
Figure 4D:
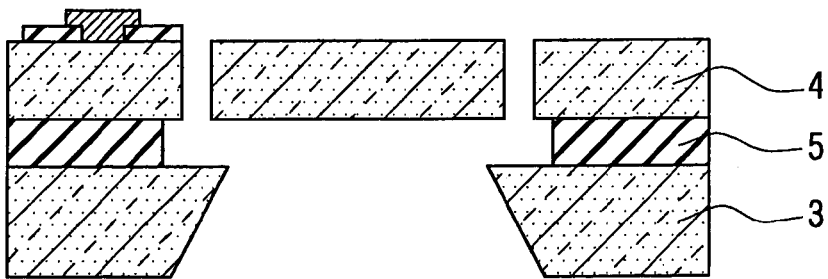

As shown in FIG. 4C, the second silicon oxide film 23 is formed on the substrate 6 with the electrode pad 15b. The second silicon oxide film 23 is etched so as to have a predetermined pattern. After that, the second semiconductor layer 4 is etched from the surface of the SOI substrate 6 to the insulation layer 5 with using the second silicon oxide film 23 as a mask. The third silicon oxide film 24 is also formed on the bottom of the substrate 6, and etched to have a predetermined pattern. The third silicon oxide film 24 is used as a mask for etching the bottom side of the substrate 6. The first semiconductor layer 3 is anisotropically etched with alkaline solution such as tetra methyl ammonium hydroxide (i.e., TMAH). Then, the insulation layer 5 is etched with hydrofluoric acid (i.e., HF) so that the insulation layer 5 is removed. Further, the silicon oxide films 21, 23, 24 disposed on the substrate 6 are removed with HF. Thus, the sensor 100 is accomplished.

Figure 5A:
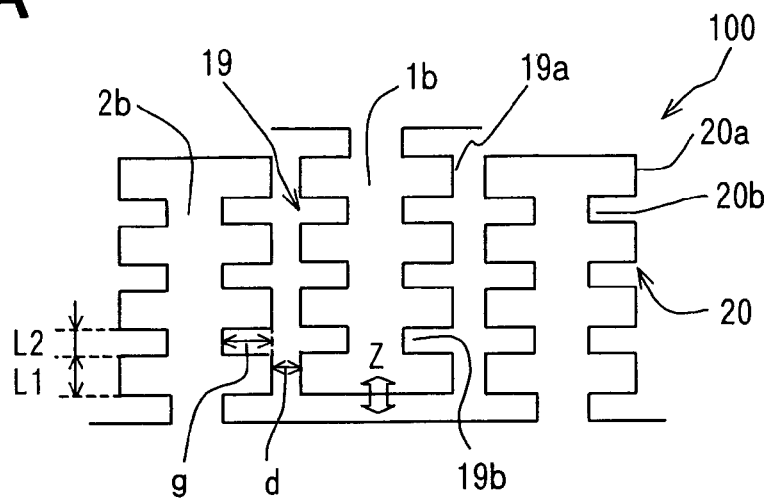
FIGS. 5A to 5C are enlarged plan view showing part of the sensing portion of IIIC in FIG. 3A for explaining an arrangement of the movable and fixed electrodes.
Figure 5B:
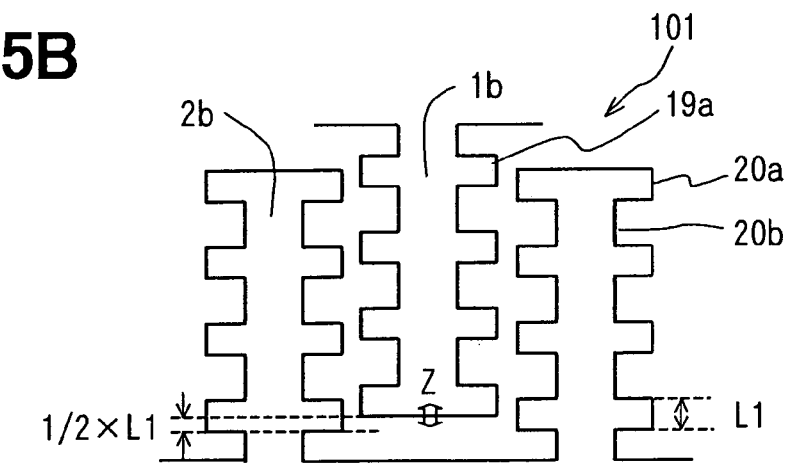
Figure 5C:
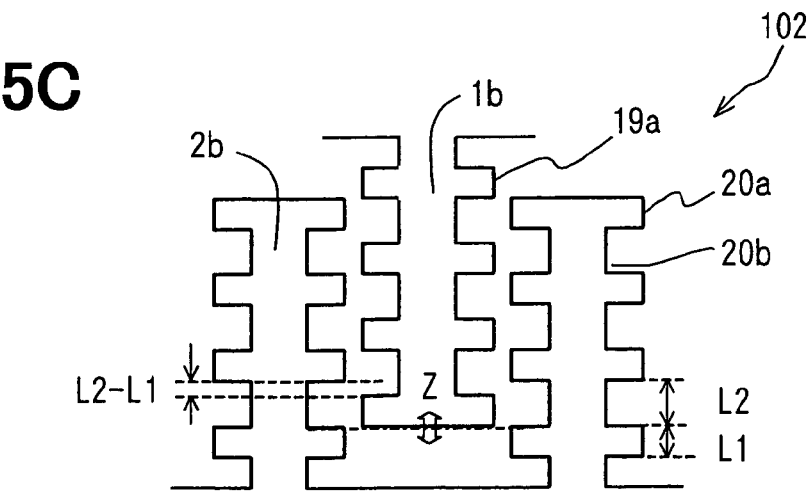

Referring to FIGS. 5A to 5C, functions and structure of the concavity and convexity portions 19, 20 disposed on the movable and fixed electrodes 1a, 1b, 2a, 2b will be explained as follows. The movable electrode 1b and the fixed electrode 2b include the concavity and convexity portions 19, 20 disposed perpendicularly to the facing surface, respectively. In the first embodiment, eight convexities are formed on each tooth of the electrodes 1b, 2b. When no acceleration is applied to the sensor 100, the convexity 19a of the movable electrode 1b faces the convexity 20a of the fixed electrode 2b, and the concavity 19b of the movable electrode 1b faces the concavity 20b of the fixed electrode 2b, as shown in FIG. 5A. Namely, the convexity 19a of the movable electrode 1b and the convexity 20a of the fixed electrode 2b provide a capacitance. Accordingly, when the acceleration in the acceleration direction Z is applied to the sensor 100, the movable electrode 1b is displaced along with the facing surface, i.e., in the acceleration direction Z, so that the capacitance between the convexities 19a, 20a changes. For example, assuming that the capacitance change of a pair of the convexities 19a, 20a defines as ΔCo, a total capacitance change ΔC shown in FIG. 5B is 8×ΔCo.

Accordingly, as the number of concavities and convexities 19a, 19b, 20a, 20b included in one tooth of the concavity and convexity portions 19, 20 becomes large, or the number of the teeth of the concavity and convexity portions 19, 20 becomes large, the whole capacitance change in the sensor 100 becomes larger by the whole number of concavities and convexities 19a, 19b, 20a, 20b included in the sensor 100. Thus, the sensor sensitivity of the sensor 100 is improved. Here, the movable electrode 1a and the fixed electrode 2a disposed on the first detection portion 17 also include the concavity and convexity portions 19, 20, respectively. Although the number of convexity 19a, 20a disposed on one tooth of the electrode 1a, 1b, 2a, 2b is eight, other number of convexity 19a, 20a can be formed on one tooth of the electrode 1a, 1b, 2a, 2b.

Next, the functions of the sensor 100 having the concavity and convexity portions 19, 20 will be described as follows. As shown in FIG. 5A, when no acceleration is applied to the sensor 100, the convexity 19a of the movable electrode 1b completely faces the convexity 20a of the fixed electrode 2b. In this case, the width of the convexity 19a, 20a is defined as L1, which is the length of the convexity 19a, 20a in the acceleration direction Z. The width of the concavity 19a, 20a is defined as L2 which is the length of the concavity 19a, 20a in the acceleration direction Z. The distance between the convexities 19a, 20a facing each other is defined as D. The depth of the concavity 19b, 20b is defined as G. The maximum displacement of the movable portion 8 is defined as Xmax, which corresponds to the acceleration in the acceleration direction Z. It is preferable that the concavity and convexity portions 19, 20 are formed to satisfy the following formulas f9–F11.

$$L1 \geq L2 \tag{F9}$$

$$L2 \geq 2 \times X\text{max} \tag{F10}$$

$$G \geq D \tag{F11}$$

When the concavity and convexity portions 19, 20 satisfy formula F9, and the width L1 of the convexity 19a, 20a is supposed to be constant, the number of the convexity 19a, 20a disposed on one tooth of the movable and fixed electrodes 1a, 1b, 2a, 2b becomes larger. Namely, the initial capacitance C0 between a pair of the convexities 19a, 20a can be secured to have a certain value, and, moreover, the whole capacitance change in the sensor 100 becomes larger.

When the concavity and convexity portions 19, 20 satisfy formula F10, even when the movable portion 8 is displaced by the maximum displacement Xmax, the convexity 19a of the movable portion 1a, 1b moves within a mid point of the concavity 20b, which is neighboring to the convexity 20a of the fixed electrode 2a, 2b facing the convexity 19a in an initial state. Here, the initial state of the sensor 100 means in a case where no acceleration is applied to the sensor 100. Accordingly, the relationship between the capacitance change and the displacement of the movable portion 8 monotonically increases or decreases.

When the concavity and convexity portions 19, 20 satisfy formula F11, the total of the distance D between the facing surfaces of the convexity 19a of the movable electrode 1a, 1b and the convexity 20a of the fixed electrode 2a, 2b and the depth G of the concavity 19b, 20b becomes twice larger than the distance D. The capacitance between the convexity 19a and the concavity 20b or the convexity 20a and the concavity 19b is provided in relation to almost the total distance of the distance D and the depth G. The capacitance between the convexity 19a and the convexity 20a is provided in relation to the distance D. Therefore, the capacitance between the convexity 19a, 20a and the concavity 19b, 20b is sufficiently smaller than the capacitance between the convexity 19a and the convexity 20a so that the capacitance between the convexity 19a, 20a and the concavity 19b, 20b can be negligible. Thus, the whole capacitance change becomes large, so that the sensor sensitivity is improved.

Next, as shown in FIG. 5B, it is assumed that part of the convexity 19a of the movable electrode 1a, 1b faces the concavity 20b of the fixed electrode 2a, 2b when no acceleration is applied to a sensor 101. When the acceleration is applied to the sensor 101, the movable electrode 1a, 1b is displaced in the acceleration direction Z. In case of the sensor 100 shown in FIG. 5A, the capacitance is reduced even when the movable electrode 1a, 1b moves upward or downward of the acceleration direction Z in FIG. 5A. That is because the facing surface of the convexity 19a, 20a is reduced. However, in case of the sensor 101 shown in FIG. 5B, the capacitance is reduced when the movable electrode 1a, 1b moves upward of the acceleration direction Z in FIG. 5B. That is because the facing surface of the convexity 19a, 20a is reduced. When the movable electrode 1a, 1b moves downward of the acceleration direction Z in FIG. 5B, the capacitance is increased. That is because the facing surface of the convexity 19a, 20a is increased. Accordingly, the sensor 101 shown in FIG. 5B can detect the direction of the acceleration by detecting the increase and decrease from the initial capacitance.

Further, in case of the sensor 101 shown in FIG. 5B, preferably the width L of the facing surface of the convexity 19a, 20a in the acceleration direction Z is almost half of the width L1 of the convexity 19a, 20a in the acceleration direction Z. In this case, even when the movable portion 8 moves upward or downward, the relationship between the capacitance change and the displacement of the movable portion 8 monotonically increases or decreases. Further, the increase and decrease are symmetrically appeared on the basis of the initial state. Therefore, the sensor can detect the vibration, i.e., the acceleration easily.

Furthermore, it is preferred that the maximum displacement Xmax of the movable electrode 1a, 1b is equal to or less than a half of the width of the convexity 19a, 20a. In this case, when the movable electrode 8 is displaced downward with the maximum displacement Xmax, the facing surface is increased so that the convexity 19a of the movable electrode 1a, 1b completely faces the convexity 20a of the fixed electrode 2a, 2b. Accordingly, the relationship between the capacitance change and the displacement of the movable portion 8 monotonically increases or decreases.

Next, as shown in FIG. 5C, it is assumed that the convexity 19a of the movable electrode 1a, 1b does not face the convexity 20a of the fixed electrode 2a, 2b when no acceleration is applied to a sensor 102. Namely, the convexity 19a of the movable electrode 1a, 1b faces the concavity 20b of the fixed electrode 2a, 2b. It is preferred that one sidewall of the convexity 19a and one sidewall of the convexity 20a are on the same line. In this case, the capacitance is increased when the movable electrode 1a, 1b moves downward of the acceleration direction Z in FIG. 5C. That is because the facing surface of the convexity 19a, 20a is increased. When the movable electrode 1a, 1b moves upward of the acceleration direction Z in FIG. 5C, the capacitance is slightly decreased. That is because the facing surface of the convexity 19a, 20a is reduced. Accordingly, the sensor 102 shown in FIG. 5C can detect the direction of the acceleration by detecting the increase and decrease from the initial capacitance.

Further, in case of the sensor 102 shown in FIG. 5C, preferably the subtracted width L2−L1 that the width L1 of the convexity 19a, 20a in the acceleration direction Z is subtracted from the width L2 of the concavity 19b, 20b in the acceleration direction Z is equal to or larger than twice of the maximum displacement Xmax of the movable portion 8. In this case, the relationship between the capacitance change and the displacement of the movable portion 8 monotonically increases or decreases. However, when the movable portion 8 moves upward of the acceleration direction Z in FIG. 5C by the maximum displacement Xmax, i.e., when the convexity 19a of the movable electrode 1a, 1b moves away from the convexity 20a of the fixed electrode 2a, 2b, the mid point of the convexity 19a of the movable electrode 1a, 1b and the mid point of the concavity 20b of the fixed electrode 2a, 2b are disposed almost on the same line. Accordingly, the capacitance between the convexity 19a of the movable electrode 1a, 1b and the convexity 20a of the fixed electrode 2a, 2b is slightly affected by the neighboring convexity 20a, which is neighboring to the convexity 20a initially facing the convexity 19a.

Therefore, it is more preferable that the total of the width L1 of the convexity 19a, 20a and the maximum displacement Xmax of the movable portion 8 is equal to or less than a half of the width L2 of the concavity 19b, 20b. In this case, even when the movable portion 8 moves by the maximum displacement Xmax, the convexity 19a of the movable electrode 1a, 1b moves within the mid point of the concavity 20b of the fixed electrode 2a, 2b. Accordingly, the relationship between the capacitance change and the displacement of the movable portion 8 monotonically increases or decreases.

In the sensors 100–102 according to the first embodiment, the movable portion 8 is formed to resonate at the acceleration vibration frequency, and the movable portion 8 is displaced in the sliding direction, in which the movable portion 8 is affected with the slide damping effect. Accordingly, the magnification Q of resonance becomes larger, so that the displacement of the movable portion 8 becomes large. Thus, the capacitance change is also increased, so that the sensor sensitivity is improved. Specifically, the sensor sensitivity is much improved in a case where the vibration frequency of the acceleration coincides to the resonant frequency, i.e., the acceleration having a predetermined frequency (i.e., the resonant frequency) can be detected by the sensor effectively.

Moreover, a plurality of concavity and convexity portions 18, 19 disposed on each facing surface of the movable and fixed electrodes 1a, 1b, 2a, 2b are provided, so that the capacitance change is enhanced by the number of a pair of the convexities 19a, 20a of the concavity and convexity portions 18, 19. Thus, the sensor sensitivity is improved.

Although the concavity and convexity portion 19, 20 has a rectangular shape, the concavity and convexity portion 19, 20 can have other shape such as orthogonal, semicircular, triangular shapes as long as the movable electrode 1a, 1b and the fixed electrode 2a, 2b are disposed at the regular intervals. Therefore, each one of the concavity 19a, 20a and the convexity 19b, 20b may have a different shape. However, it is preferred that all of the concavity 19a, 20a and the convexity 19b, 20b have the same shape formed at regular intervals, because it is required to enlarge the capacitance change and to manufacture the sensor easily.

Further, the sensor includes the sensing portion 7 formed on the first semiconductor layer 3, the sensing portion 7 having a plurality of movable portion 8, each of which resonates at the different vibration frequency. In this case, when the acceleration detected by the sensor is disposed in a predetermined range of the vibration frequency, i.e., when the acceleration has the different vibration frequency, the sensor can detect the acceleration in the predetermined range. That is because the movable portion 8 resonates at the different vibration frequency in the predetermined range.

SECOND EMBODIMENT

Figure 6A:
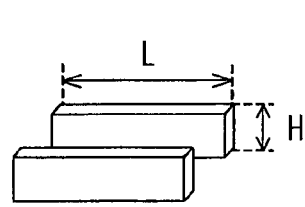
FIGS. 6A to 6C are schematic perspective views showing a pair of facing surfaces of the fixed and movable electrodes in a capacitance type acceleration sensor according to a second embodiment of the present invention.
Figure 6B:
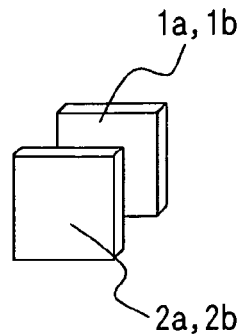
Figure 6C:
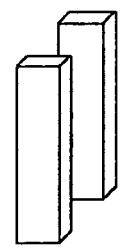

A capacitance type acceleration sensor according to a second embodiment has the movable electrode 1a, 1b and fixed electrode 2a, 2b, as shown in FIGS. 6A to 6C. The movable electrode 1a, 1b moves in a perpendicular direction of the facing surface. In this case, the squeeze damping effect works between the facing surfaces of the movable and fixed electrodes 1a, 1b, 2a, 2b. However, in a conventional sensor, the length L of the facing surface of the movable and fixed electrodes 1a, 1b, 2a, 2b is longer than the height H of the facing surface. Therefore, the conventional sensor cannot detect a fine acceleration because of the squeeze damping effect.

The inventors examine the relationship between shape of the facing surface and squeeze damping coefficient E in case of a parallel plate model. Here, the parallel plate model includes a single movable electrode 1a, 1b and a single fixed electrode 2a, 2b, which face each other. The examination is performed with using the following Reynolds equation.

$$E = \frac{64\beta P o A}{\pi^6 \omega D} \sum_{m,n=odd} \frac{m^2 + R^2 n^2}{(mn)^2 \{(m^2 + R^2 n^2)^2 + \beta^2/\pi^2\}} \quad (F12)$$

Here, $\beta$, A, and R in Formula F12 are defined as follows.

$$\beta = \frac{12\mu_{eff} \cdot L^2 \omega}{PoD^2} \quad (F13)$$

$$\mu_{eff} = \frac{\mu}{1 + 9.638\left(\frac{\lambda}{D}\right)^{1.159}} \quad (F14)$$

$$A = LH \quad (F15)$$

$$R = L/H \quad (F16)$$

Here, Po represents atmospheric pressure (i.e., Po=1.013× $10^5$ Pa), $\mu$ a viscosity of the air (i.e., $\mu$=1.82×$10^{-5}$ Pa·s), $\lambda$ a mean free path of the air (i.e., $\lambda$=6.515×$10^{-8}$ m), D the distance between the electrodes (i.e., D=4 μm), L (μm) the length of the facing surface of the movable electrode 1a, 1b and the fixed electrode 2a, 2b (i.e., the length of the facing surface in the protrusion direction of the movable electrode 1a, 1b protruded from the weight portion 11), H (μm) the height of the facing surface of the movable and fixed electrodes 1a, 1b, 2a, 2b, and $\omega$ the vibration frequency. The vibration frequency $\omega$ is, for example, set to 2 kHz, which is the resonant frequency of the movable portion 8.

Figure 7:
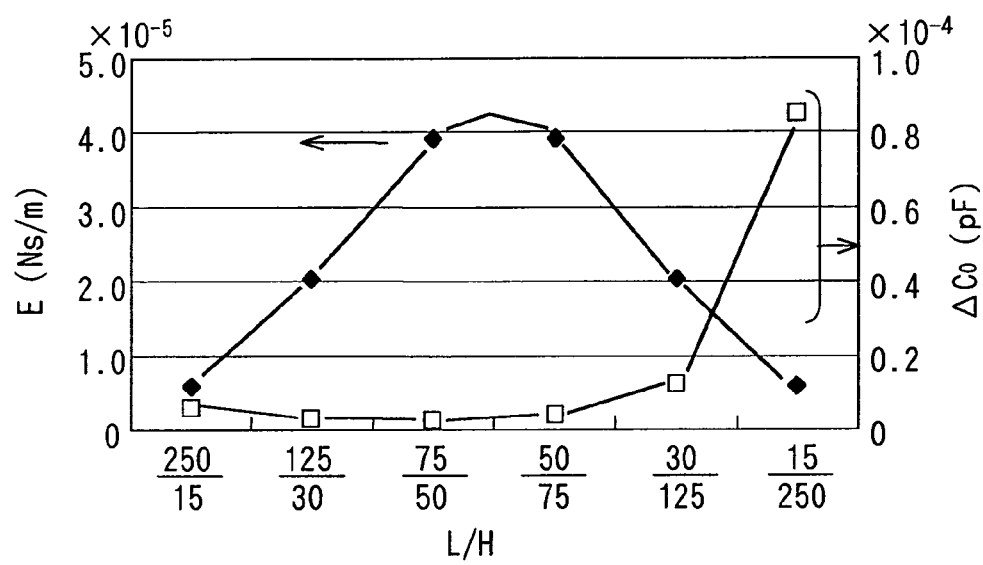
FIG. 7 is a graph showing a relationship between aspect ratio L/H and damping coefficient E or capacitance change ΔCo in the sensor according to the second embodiment.

FIGS. 6A to 6C show typical parallel plate models having a pair of the facing surfaces, the length of which is L (μm), and the height of which is H (μm). FIG. 7 shows a relationship between the aspect ratio L/H of the facing surface and the damping coefficient E. FIG. 7 also shows the relationship between the aspect ratio L/H and the capacitance change ΔCo. Here, the area of the facing surface is constant.

As shown in FIG. 7, the damping coefficient E becomes the maximum value when the length L is equal to the height H, i.e., the facing surface has a square shape. When one of the length L or the height H becomes long, and the other becomes short, the damping coefficient E is reduced. Namely, assuming that the area of the facing surface is determined to have a certain area, the squeeze damping effect is reduced as the surrounding length of the facing surface becomes longer.

When the height H of the facing surface becomes larger, the capacitance change ΔCo is increased. The movable electrode 1a, 1b protrudes from the sidewall of the weight portion 11, which is perpendicular to the surface of the first semiconductor layer 3. The height of the movable electrode 1a, 1b is almost equal to the height of the weight portion 11 (i.e., the thickness of the sidewall of the weight portion 11). Accordingly, when the height H of the movable electrode 1a, 1b becomes larger, i.e., the facing surface has a vertical rectangular shape, the height of the weight portion 11 also becomes large. Therefore, the weight M of the weight portion 11 becomes larger according to the height of the weight portion 11. Accordingly, as described in Formula F4, the magnification Q of resonance becomes large, so that the displacement X of the movable portion 8 becomes larger. Thus, the capacitance change ΔCo is increased.

Figure 8:
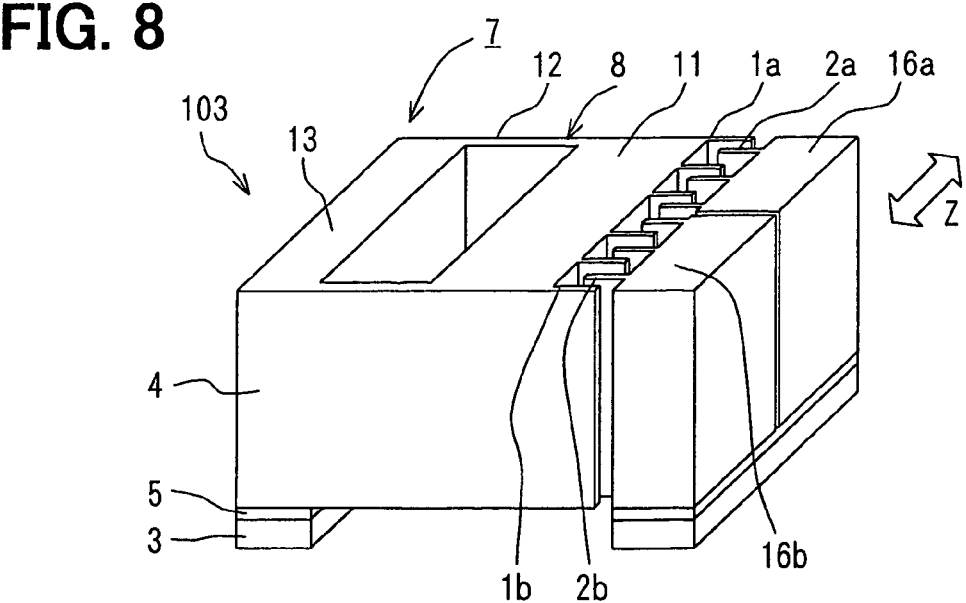
FIG. 8 is a perspective view showing the sensor according to the second embodiment.

The sensing portion 7 of a sensor 103 according to the second embodiment is shown in FIG. 8. When the sensor 103 is applied with the acceleration in the acceleration direction Z, the movable portion 8 is displaced in the acceleration direction Z, which is perpendicular to the facing surface of the electrodes 1a, 1b, 2a, 2b. Each facing surface of the movable and fixed electrodes 1a, 1b, 2a, 2b has a vertical rectangular shape. Namely, the height of the facing surface is larger than the length of the facing surface. Therefore, the squeeze damping coefficient E becomes small. Further, the height of the weight portion 11 is almost equal to the height of the movable electrode 1a, 1b, so that the mass of the weight portion 11 becomes large.

Accordingly, the magnification Q of resonance is increased, and the displacement of the movable portion 8 at the resonance point is also enhanced, so that the capacitance change ΔCo becomes large. Thus, the sensor sensitivity is improved so that the sensor 103 can detect a fine acceleration.

THIRD EMBODIMENT

Figure 9A:
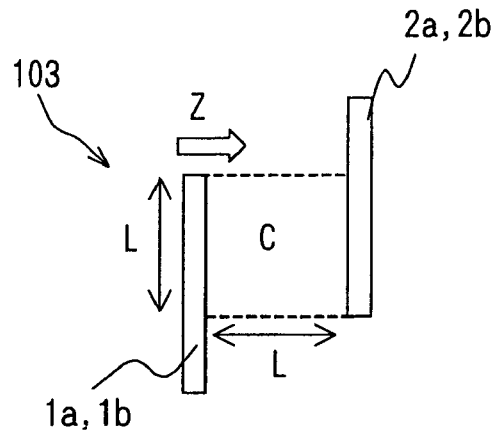
FIGS. 9A to 9F are schematic perspective views showing a pair of facing surfaces of the fixed and movable electrodes in a capacitance type acceleration sensor according to a third embodiment of the present invention.
Figure 9B:
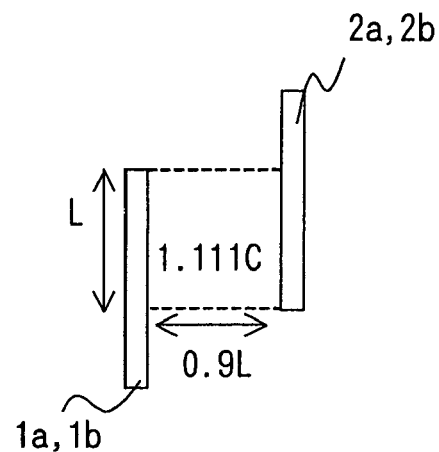
Figure 9C:
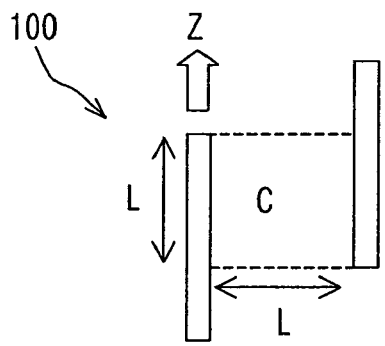
Figure 9D:
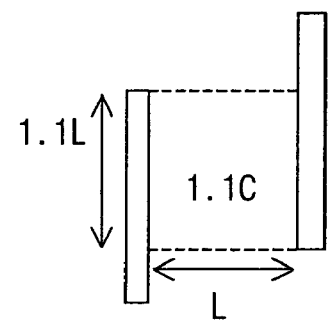
Figure 9E:
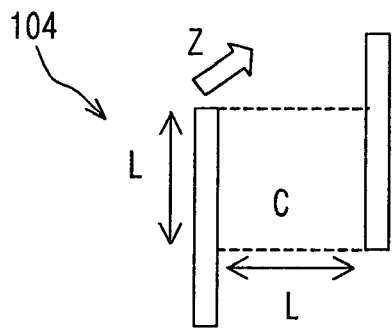
Figure 9F:
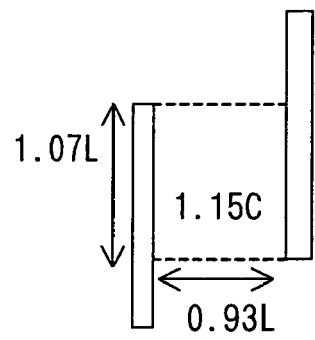

A capacitance type acceleration sensor 104 according to a third embodiment has facing surfaces of the movable and fixed electrodes 1a, 1b, 2a, 2b, and a predetermined angle (i.e., a tilt angle) between each facing surface and the acceleration direction Z is set between 0° and 90°, as shown in FIG. 9E and 9F. Here, in the sensor 100 shown in FIGS. 3A, 9C and 9D, the movable portion 8 is displaced along with the facing surface, and in the sensor 103 shown in FIGS. 8, 9A and 9B, the movable portion 8 is displaced in the perpendicular direction perpendicular to the facing surface. Namely, the facing surface in the sensors 100, 103 is disposed perpendicular or parallel to the acceleration direction z.

FIGS. 9A to 9F show the capacitance change ΔCo in case of various sensor 100, 103, 104. FIGS. 9A to 9E also show a capacitance area shown as C, 1.15C, and the like disposed between a pair of movable and fixed electrodes 1a, 1b, 2a, 2b. The capacitance area is a square portion formed of the length of the facing surface and the distance between the movable and fixed electrodes 1a, 1b, 2a, 2b. When no acceleration is applied to the sensor 100, 103, 104, both the length and the distance are set to L, and the capacitance is set to C, as shown in FIGS. 9A, 9C and 9E. When the acceleration is applied to the sensor 100, 103, 104, the movable portion 8, i.e., the movable electrode 1a, 1b is displaced by 0.1L in the acceleration direction, as shown in FIGS. 9B, 9D and 9F.

As shown in FIGS. 9A and 9B, in case of the sensor 103, the movable electrode 1a, 1b is displaced toward the fixed electrode 2a, 2b by 0.1L, so that the distance between the movable and fixed electrodes 1a, 1b, 2a, 2b changes from L to 0.9L. Then, the capacitance also changes from C to 1.111C.

As shown in FIGS. 9C and 9D, in case of the sensor 100, the movable electrode 1a, 1b is displaced along with the facing surface by 0.1L, so that the length of the facing surface changes from L to 1.1L. Then, the capacitance changes from C to 1.1C.

As shown in FIGS. 9E and 9F, in a case where the acceleration direction Z inclines at a 45 degree against the facing surface, the movable electrode 1a, 1b is displaced in the acceleration direction Z by 0.1L, so that the distance between the electrodes 1a, 1b, 2a, 2b changes from L to 0.93L, and the length of the facing surface changes from L to 1.07L. Accordingly, the capacitance changes from C to 1.15C.

Thus, the sensor 104 has the largest capacitance change ΔCo, i.e., 0.15C among the sensors 100, 103, 104. Namely, it is preferred that the tilt angle between the facing surface of the movable and fixed electrodes 1a, 1b, 2a, 2b and the acceleration direction Z is in a range between 0° and 90° so that the sensor 104 has a large capacitance change ΔCo.

Figure 10:
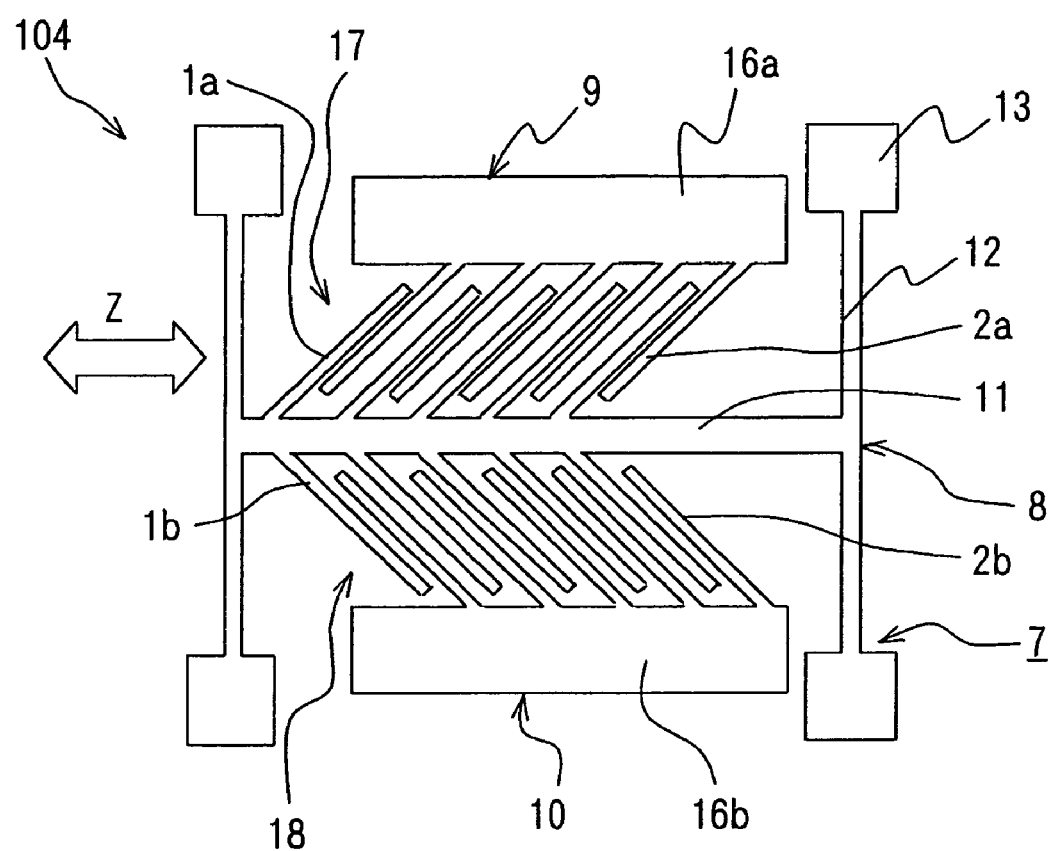
FIG. 10 is a plan view showing a sensing portion of the sensor according to the third embodiment.

The sensing portion 7 of the sensor 104 according to the third embodiment is shown in FIG. 10.

Figures 11A, 11B, 11C:
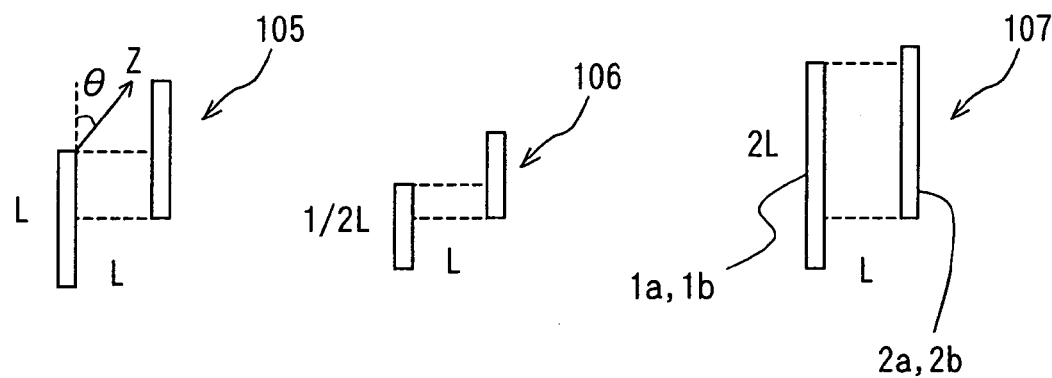
FIGS. 11A to 11C are schematic perspective views showing the facing surface in the different sensors according to the third embodiment.

Next, the relationship between the tilt angle θ between the facing surface and the acceleration direction Z and the capacitance change ΔCo is examined in detail. Specifically, as shown in FIGS. 11A to 11C, a sensor 105 has the length of the facing surface of L and the distance between the electrodes of L, i.e., the sensor 105 has a square capacitance area. A sensor 106 has the length of ½L and the distance of L, i.e., the sensor 106 has a horizontal rectangular capacitance area. A sensor 107 has the length of 2L and the distance of L, i.e., the sensor 106 has a vertical rectangular capacitance area. The movable portion is displaced by 0.1L in the acceleration direction Z, which inclines at the tilt angle θ against the facing surface.

Figure 12:
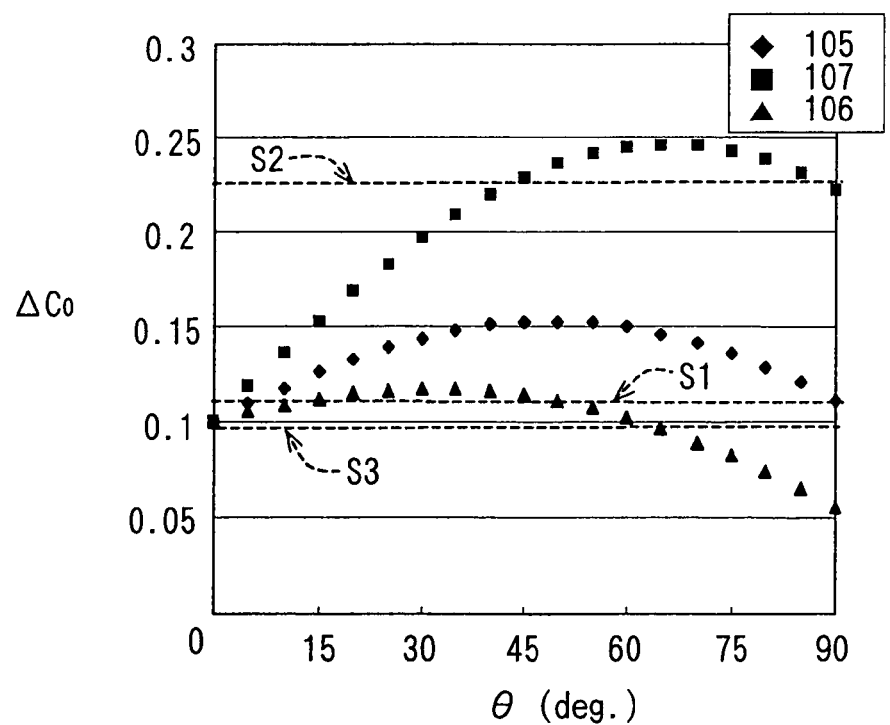
FIG. 12 is a graph showing a relationship between tilt angle θ and capacitance change ΔCo in the different sensors according to the third embodiment.

FIG. 12 shows the relationship between the tilt angle θ and the capacitance change ΔCo in case of various sensors 105, 106, 107. In FIG. 12, a line S1 shows the capacitance change ΔCo that is the largest value among the sensors 100, 103 in a case where the sensor 100, 103 has the square capacitance area of the length of L and the distance of L and the tilt angle θ is 0° (that is in case of the sensor 100) or 90° (that is in case of the sensor 103). A line S2 shows the capacitance change ΔCo that is the largest value among the sensors 100, 103 in a case where the sensor 100, 103 has the horizontal rectangular capacitance area of the length of ½L and the distance of L and the tilt angle θ is 0° or 90°. A line S3 shows the capacitance change ΔCo that is the largest value among the sensors 100, 103 in a case where the sensor 100, 103 has the vertical rectangular capacitance area of the length of 2L and the distance of L and the tilt angle θ is 0° or 90°.

As shown in FIG. 12, all of the sensors 105–107 have a certain tilt angle θ, at which the capacitance change ΔCo of the sensor 105–107 is larger than that of the sensors 100, 103. Namely, there are some tilt angles θ, at which the capacitance change ΔCo of each sensor 105–107 is larger than the corresponding line S1–S3. In a case where the capacitance area is the horizontal rectangular, the capacitance change ΔCo of the sensor 106 in a certain range of the tilt angle θ is larger than that of the sensors 100, 103. In the certain range, the displacement of the movable electrode 1*a*, 1*b* in the sliding direction S becomes larger. In a case where the capacitance area is the vertical rectangular, the capacitance change ΔCo of the sensor 107 in a certain range of the tilt angle θ is larger than that of the sensors 100, 103. In the certain range, the displacement in the sliding direction S becomes larger. In a case where the capacitance area is the square, the capacitance change ΔCo of the sensor 105 in almost all range of the tilt angle θ is larger than that of the sensors 100, 103. Specifically, when the tilt angle θ is 45°, the capacitance change ΔCo of the sensor 105 becomes the maximum value.

Thus, in the sensor 104–107 according to the third embodiment, the facing surface of the movable and fixed electrodes 1*a*, 1*b*, 2*a*, 2*b* inclines at the tilt angle θ against the acceleration direction Z, the tilt angle θ being in a range between 0° and 90°. When the acceleration is applied to the sensor 104–107, the distance between the electrodes becomes short and the length of the facing surface becomes long, or the distance becomes long and the length becomes short, so that the capacitance change becomes larger. Therefore, the sensor sensitivity of the sensor 104–107 is improved.

Further, when the capacitance area is the square, in a wide range of the tilt angle θ, the capacitance change ΔCo of the sensor 104–107 can be increased. Furthermore, when the tilt angle θ is 45°, the capacitance change ΔCo becomes the maximum value, so that the sensor sensitivity is much improved.

In this embodiment, the concavity and convexity portion 19, 20 can be formed on the facing surface of the movable and fixed electrodes 1*a*, 1*b*, 2*a*, 2*b*. In this case, the sensor sensitivity is much improved. Preferably, when no acceleration is applied to the sensor 104–107, part of the convexity 19*a* of the movable electrode 1*a*, 1*b* faces the convexity 20*a* of the fixed electrode 2*a*, 2*b*. In this case, when the acceleration is applied so as to increase the area of the facing surface, the capacitance C is increased. When the acceleration is applied so as to decrease the area of the facing surface, the capacitance C is decreased. Accordingly, the sensor 104–107 can detect the direction of the acceleration by detecting the increase and decrease from the initial capacitance.

Moreover, it is preferred that each facing surface of the convexities 19*a*, 20*a* inclines at the tilt angle θ against the acceleration direction Z, the tilt angle θ being in a range between 0° and 90°. In this case, the capacitance change ΔCo becomes larger. Further, the facing surface is almost the square, and the tilt angle θ is 45°, the capacitance change ΔCo become much larger. Specifically, in a case where the sensor has the concavity and convexity portion 19, 20, the total capacitance change ΔC is increased by the number of the convexities 19*a*, 20*a*.

Although the sensor 104–107 according to the third embodiment is the capacitance type acceleration sensor with using the resonance of the movable portion 8, the sensor 104–107 can be another type of dynamical quantity sensor.

Such changes and modifications are to be understood as being within the scope of the present invention as defined by the appended claims.

What is claimed is:

1. A capacitance acceleration sensor comprising:
a semiconductor substrate;
a weight portion supported with the substrate through a spring portion;
a movable electrode integrated with the weight portion; and
a fixed electrode cantilevered with the substrate,
wherein the movable electrode together with the weight portion is displaced toward the fixed electrode in accordance with acceleration applied to the weight portion,
wherein the movable electrode includes a facing surface facing a facing surface of the fixed electrode so as to provide a capacitor having a capacitance,
wherein the capacitance of the capacitor changes in accordance with a displacement of the movable electrode so that an outer circuit detects the acceleration as a capacitance change,
wherein each facing surface of the movable and fixed electrodes inclines at a predetermined angle with respect to a displacement direction, the predetermined angle being in a range between 0° and 90°,
wherein each of the movable and fixed electrodes has a plurality of teeth,
wherein the teeth of the movable and fixed electrodes are disposed alternately so that sidewalls of the teeth provide the facing surfaces,
wherein the movable electrode has a predetermined share in such a manner that the movable portion resonates at a vibration frequency of the acceleration for increasing the capacitance change,
wherein each facing surface of the movable and fixed electrodes has a length along with the facing surface, and
wherein the length of the facing surface is equal to a distance between the movable and fixed electrodes so that the capacitor has a square shape when no acceleration is applied.

2. The sensor according to claim 1,
wherein each facing surface of the movable and fixed electrodes inclines at almost 45 degrees with respect to the displacement direction.

3. A capacitance acceleration sensor comprising:
a semiconductor substrate;
a weight portion supported with the substrate through a spring portion;
a movable electrode integrated with the weight portion; and
a fixed electrode cantilevered with the substrate,
wherein the movable electrode together with the weight portion is displaced toward the fixed electrode in accordance with acceleration applied to the weight portion,
wherein the movable electrode includes a facing surface facing a facing surface of the fixed electrode so as to provide a capacitor having a capacitance,
wherein the capacitance of the capacitor changes in accordance with a displacement of the movable electrode so that an outer circuit detects the acceleration as a capacitance change,
wherein each facing surface of the movable and fixed electrodes inclines at a predetermined angle with respect to a displacement direction, the predetermined angle being in a range between 0° and 90°,
wherein each facing surface of the movable and fixed electrodes has a concavity and convexity portion for increasing the capacitance change,
wherein the concavity and convexity portion has a plurality of concavities and convexities, each of which is disposed at a predetermined intervals, and wherein each convexity of the movable electrode faces the convexity of the fixed electrode, respectively, when no acceleration is applied.

4. The sensor according to claim 3,
wherein each convexity of the movable and fixed electrodes has a facing surface, a pair of which faces each other for providing a capacitor,
wherein each facing surface of the convexity of the movable and fixed electrodes has a length along with the facing surface, and
wherein the length of the facing surface of the convexity is equal to a distance between a pair of the convexities of the movable and fixed electrodes so that the capacitor between a pair of the facing surfaces of the movable and fixed electrodes has a square shape when no acceleration is applied.

5. The sensor according to claim 4, wherein each facing surface of the convexities of the movable and fixed electrodes inclines at almost 45 degrees with respect to the displacement direction of the movable portion.

6. A capacitance type acceleration sensor comprising:
a semiconductor substrate;
a weight portion supported with the substrate through a spring portion;
a movable electrode integrated with the weight portion; and
a fixed electrode cantilevered with the substrate,
wherein the movable electrode together with the weight portion is displaced toward the fixed electrode in accordance with acceleration applied to the weight portion,
wherein the movable electrode includes a facing surface facing a facing surface of the fixed electrode so as to provide a capacitor having a capacitance,
wherein the capacitance of the capacitor changes in accordance with a displacement of the movable electrode so that an outer circuit detects the acceleration as a capacitance change,
wherein each facing surface of the movable and fixed electrodes inclines at a predetermined angle with respect to a displacement direction, the predetermined angle being in a range between 0° and 90°,
wherein each facing surface of the movable and fixed electrodes has a concavity and convexity portion for increasing the capacitance change,
wherein the concavity and convexity portion has a plurality of concavities and convexities, each of which is disposed at a predetermined intervals, and
wherein part of the convexity of the movable electrode faces the convexity of the fixed electrode when no acceleration is applied.

* * * * *